May 3, 1960     J. BARTA ET AL     2,934,919
POWER TRANSMISSION
Filed Jan. 19, 1959
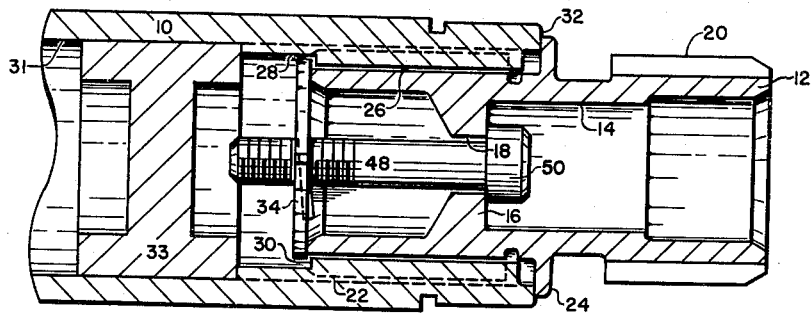
FIG. 1
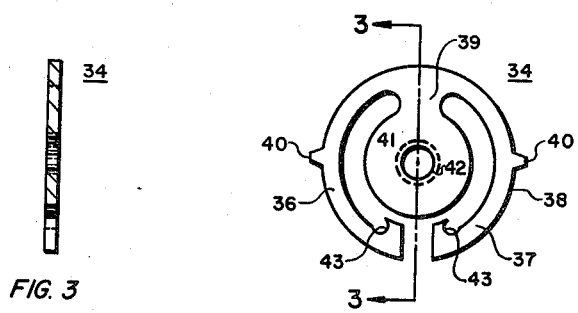
FIG. 3
FIG. 2
INVENTORS
JAMES BARTA
EDWARD F. McENTEE
BY
ATTORNEYS United States Patent Office 2,934,919
Patented May 3, 1960

2,934,919

POWER TRANSMISSION

James Barta, Roseville, and Edward F. McEntee, Royal Oak, Mich., assignors to Vickers Incorporated, Detroit, Mich., a corporation of Michigan Application January 19, 1959, Serial No. 787,733

6 Claims. (Cl. 64—9)

This invention relates to power transmissions, particularly to those of the type comprising two or more fluid pressure energy translating devices, one of which may function as a pump and another as a fluid motor.

The invention is generally concerned with a means for transmitting power from a driven to a driver unit, or vice versa, and is particularly concerned with a device which not only provides positive locking of a main shaft to a coupling shaft, but in addition, provides a flexible connection between the shafts.

It is well known that in connecting driven and driver shafts of power units to each other that it is desirable to provide for misalignment of the shafts. Where the shafts are positively locked to each other and the connection is not a flexible one, misalignment of the shafts creates an extra heavy load burden. Where the shafts are flexibly connected to each other to provide for misalignment thereof and the shafts are not positively locked to each other, under some conditions, such as high speed and heavy load, vibration causes the shafts to move out of position in relation to each other.

Patent No. 2,650,484 to Henry C. Bujak describes a prior art device which has proven to be functionally most effective in providing a flexible but positive lock between driving and driven shafts. The drawbacks to the Bujak device have been: that the main shaft 10 must provide access from the end opposite the coupling shaft 12 to permit insertion of the toothed disc 34; that the dished shape of disc 34 requires a relatively expensive forming die, and that the washer has to be oriented on assembly so as to present its concave side to the screw 48.

It is therefore an object of the present invention to provide an improved device for positively locking a coupling shaft to a main shaft which is unaffected by vibration.

It is a further object of the present invention to provide an improved device for not only positively locking, but at the same time flexibly connecting a coupling shaft to a main shaft to compensate for misalignment of a shaft adapted to be connected to the main shaft.

It is also an object of this invention to provide an improved flexible and positive locking connection device between a main shaft and a coupling shaft which is well suited to low cost, large quantity production and which will give a long and useful life in spite of repeated use.

Another object is to provide such a locking connection device which will not require access from the back end of the main shaft, or require directional orientation on assembly.

Further objects and advantages of the present invention will be apparent from the following description, reference being had to the accompanying drawing wherein a preferred form of the present invention is clearly shown.

In the drawing:

Figure 1 is a sectional view of a main shaft and coupling shaft embodying a preferred form of the present invention.

Figure 2 is an elevation view of a preferred form of the present invention.

Figure 3 is a sectional view taken on line 3—3 of Figure 2.

Referring now to Figure 1, there is shown a main shaft 10, such as of a hydraulic pump or motor, mechanically connected to which is a coupling shaft 12. The coupling shaft 12 is provided with a bore 14 extending completely therethrough which is divided by a wall 16 having a centrally located screw hole 18. The coupling shaft 12 is also provided with male splines at the right and left ends thereof indicated by the numerals 20 and 22 between which is located a land 24.

The main shaft 10 is provided with a splined bore 26 having a counterbore 28 forming a shoulder 30. The splined teeth of the coupling shaft 12 to the left of the land 24 are preferably adapted to mesh loosely with the splined teeth of the bore 26 so as to permit a slight relative radial movement of the shafts. The insertion of the coupling shaft 12 within the shaft is limited by the right end surface of the shaft 10, indicated by the numeral 32, forming an abutment for the land 24 of the shaft 12.

Shaft 10 is also counterbored at 31 to receive a plug 33 which may be permanently brazed or welded in place after broaching of the female spline.

Mounted within the splined bore 28 of the shaft 10 is a metallic disc or stop nut 34 shown more clearly in Figures 2 and 3. The disc 34 is preferably a spring metal stamping and includes two arms 36 and 37 which form a rim 38. A neck 39 extends from the juncture of arms 36 and 37 to support an inner section 41 having a tapped hole 42 centrally located therein. The ends of the two arms 36 and 37 each have a hooklike conformation 43 to receive the prongs of a pair of compressing pliers of the type conventionally used with internal snap rings. In the unstressed condition, the diameter of the rim 38 is substantially greater than the tooth tip diameter of the female spline in bore 26 but somewhat less than the tooth tip diameter in the counterbore 28. Further, in the unstressed condition the inner section 41 lies in the plane of arms 36 and 37.

Formed on the rim portion 38 of the disc 34 are a plurality of teeth 40 which are adapted in the unstressed condition of disc 34 to mesh loosely with some of the teeth of the bore 28 so as to prevent rotation of the disc but so as to permit a slight relative radial movement between the disc 34 and the shaft 10. The disc 34 may be easily mounted in the main shaft at any time by using compressing pliers to reduce the diameter of rim 38 to less than the tooth tip diameter of the female spline of bore 26, and then passing the disc through bore 26 into counterbore 28, where it is permitted to expand, and may be utilized for the connecting thereto of a coupling shaft, such as is shown. When needed, all that is necessary to connect the coupling shaft 12 to the main shaft 10 is a screw 48, such as is shown, having a head 50 with a larger diameter than the diameter of the hole 18. Removal can be accomplished with equal ease.

As noted, the tooth tip diameter of the splined bore 26 of the main shaft 10 is smaller than the tooth root diameter of the lock nut 34 thus providing a shoulder abutment against which the lock nut 34 may bear. In addition, the tooth root diameter of the lock nut 34 is slightly less than the tooth tip diameter of the splined counterbore 28.

When the screw 48 is threaded into the disc 34, the latter is drawn towards the right end of the coupling shaft in abutment against the left end of the coupling shaft 12. Once disc 34 has contacted abutment 30, further tightening of screw 48 will cause resilient deflection of neck 39 and a cocking of inner section 41 out of the plane of arms 36 and 37, as shown in Figure 1. This resiliently loaded cocking action clamps the disc threads to the screw threads with a tight grip which is highly resistant to vibration. With leftward movement of the coupling shaft 12 limited by the abutment 32, the axial movement of the coupling shaft is actually determined by the length of that portion of the coupling shaft 12 extending beyond the shoulder 30.

Thus, the lock nut construction positively locks the coupling shaft to the main shaft and as the lock nut is free to move slightly radially and axially, the device provides both a positive locking means unaffected by vibration and a flexible coupling connection to compensate for misalignment of a shaft of a unit adapted to be connected to the coupling shaft.

It should also be noted that the disc 34 is adapted to low cost large quantity production because it may be made entirely by stamping with the exception of the threading of the punched hole. The disc is also adapted to be continually used in spite of continued connection and disconnection of the unit with which it is associated.

While the form of embodiment of the invention as herein disclosed constitutes a preferred form, it is to be understood that other forms might be adopted, all coming within the scope of the claims which follow.

What is claimed is as follows:

1. In combination a main shaft having a female spline, a coupling shaft having a male spline in mesh with the female spline, a locking element mounted in the female spline, said element comprising a disc member provided with a rim and a female-threaded central portion attached at one side to said rim by a resilient, deformable neck portion, and screw means associated with the coupling shaft and threaded into the disc for locking the disc on the screw and mechanically connecting the coupling shaft to the main shaft.

2. In combination a main shaft having a female spline, a coupling shaft having a male spline in mesh with the female spline, a counterbore in said female spline to provide a region of increased tooth tip diameter, a locking element mounted in the female spline, said element comprising a disc member provided with a generally circular rim, said rim comprising a pair of arms deflectable to reduce the diameter of said rim from its normal unstressed diameter, so as to permit it to pass through said female spline into said counterbore, and a female-threaded portion attached at one side to said rim by a resilient, deformable neck portion, and screw means associated with the coupling shaft and threaded into the disc for locking the disc on the screw and mechanically connecting the coupling shaft to the main shaft.

3. In combination a main shaft having a female spline, a coupling shaft having a male spline in mesh with a portion of the female spline, a counterbore in said female spline to provide a region of increased tooth tip diameter, a locking element mounted in the female spline, said element comprising a disc member provided with a generally circular rim having a diameter in the unstressed condition greater than the tooth tip diameter of said meshing portion of said female spline, but less than the tooth tip diameter of said female spline in the region of said counterbore, said rim comprising a pair of arms deflectable to reduce the diameter of said rim from its normal unstressed diameter, so as to permit it to pass through said female spline into said counterbore, and a female-threaded portion attached at one side to said rim by a resilient, deformable neck portion, and screw means associated with the coupling shaft and threaded into the disc for locking the disc on the screw and mechanically connecting the coupling shaft to the main shaft.

4. In combination a main shaft having a female spline, a coupling shaft having a male spline in mesh with a portion of the female spline, a counterbore in said female spline to provide a region of increased tooth tip diameter, a locking element mounted in the female spline, said element comprising a disc member provided with a generally circular rim having male spline teeth thereon and having a diameter in the unstressed condition greater than the tooth tip diameter of said meshing portion of said female spline, but less than the tooth tip diameter of said female spline in the region of said counterbore, said male spline teeth having a tooth tip diameter less than the tooth root diameter of said female spline, said rim comprising a pair of arms deflectable to reduce the diameter of said rim from its normal unstressed diameter, so as to permit it to pass through said female spline into said counterbore, and a female-threaded portion attached at one side to said rim by a resilient, deformable neck portion, and screw means associated with the coupling shaft and threaded into the disc for locking the disc on the screw and mechanically connecting the coupling shaft to the main shaft.

5. An article of manufacture comprising, a flat, generally disc-like coupling lock composed of a resiliently deformable material and having an arcuately extending pair of arms, male spline teeth on its periphery, a central portion normally coplanar with said arms and having connecting means therein, and a neck portion connecting said central portion to said arms so as to permit deflection of said central portion out of the plane of said arms.

6. An article of manufacture comprising, a flat, generally disc-like coupling lock composed of a resiliently deformable material and having an arcuately extending pair of arms, male spline teeth on its periphery, a central portion normally coplanar with said arms and having threaded connecting means therein, and a neck portion connecting said central portion to said arms so as to permit deflection of said central portion out of the plane of said arms.

References Cited in the file of this patent
UNITED STATES PATENTS

| | | |
|---|---|---|
| 2,650,484 | Bujak | Sept. 1, 1953 |
| 2,809,686 | Sheperd | Oct. 15, 1957 |
| 2,825,379 | Becker | Mar. 4, 1958 |